C. J. PATTERSON.
APPARATUS FOR DISINFECTING BAKERY PRODUCTS.
APPLICATION FILED JUNE 24, 1921.
1,437,907.
Patented Dec. 5, 1922.
3 SHEETS—SHEET 3.
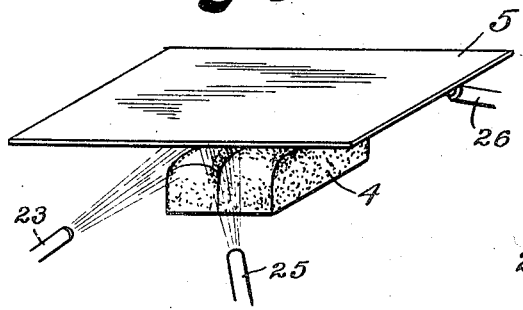
*Fig. 5.*
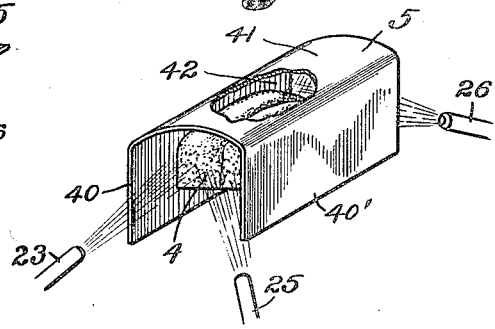
*Fig. 6.*
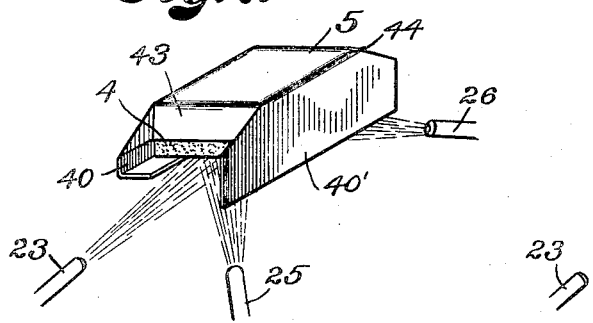
*Fig. 7.*
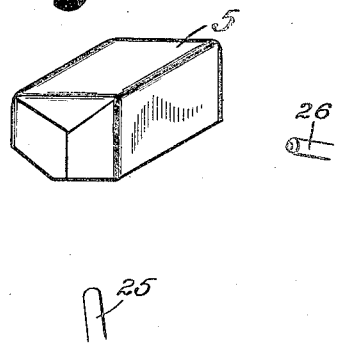
*Fig. 8.*
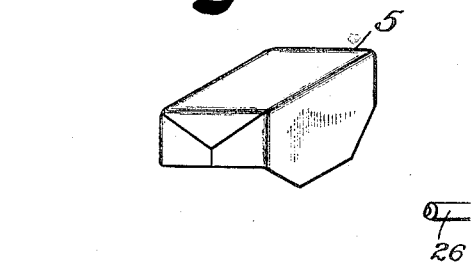
*Fig. 9.*
*Fig. 10.*
INVENTOR
Curtis J. Patterson.
BY
ATTORNEY Patented Dec. 5, 1922.

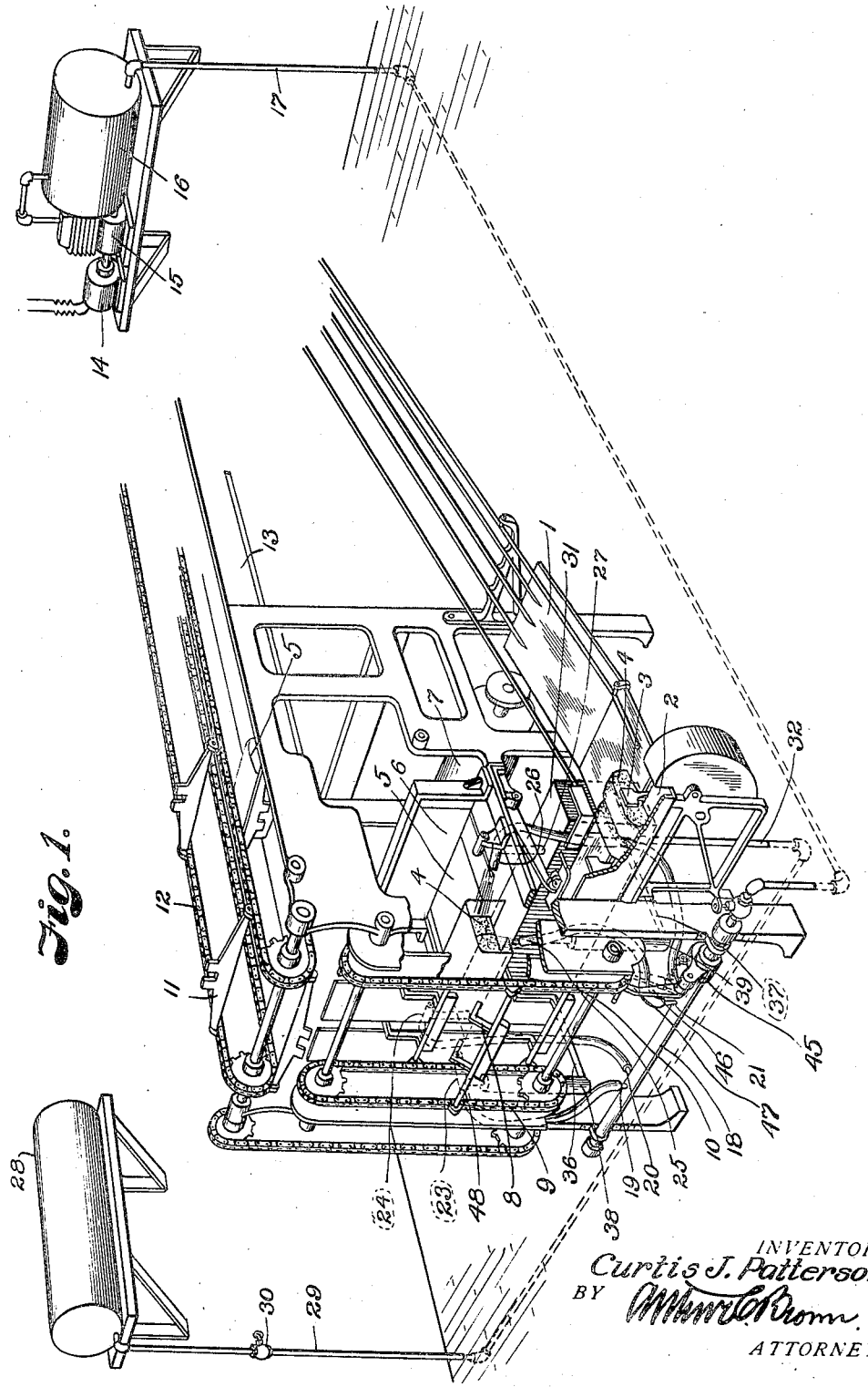

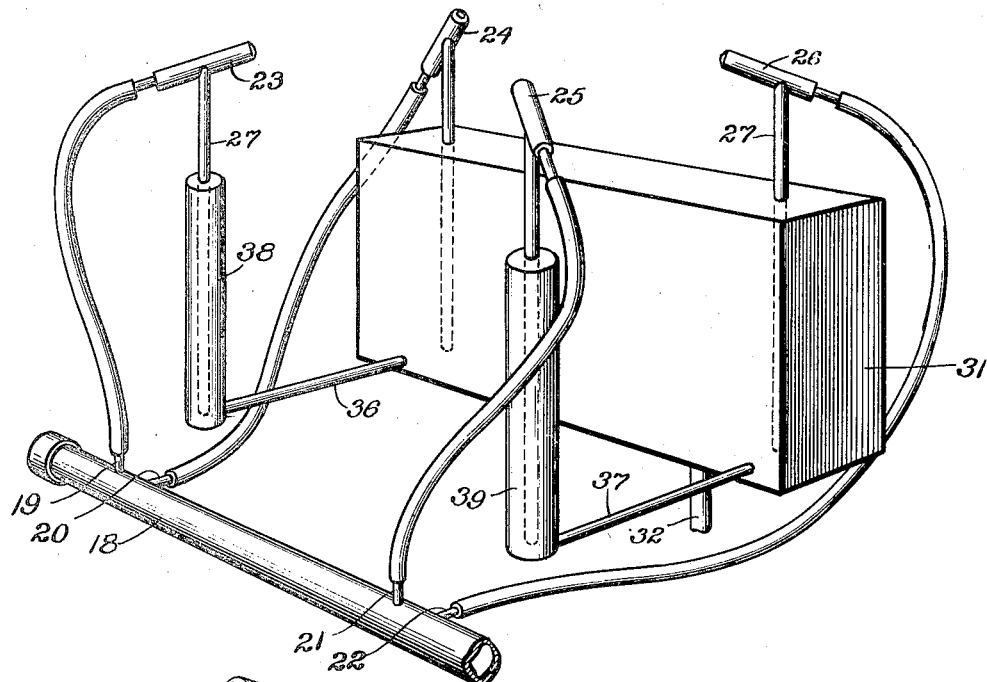
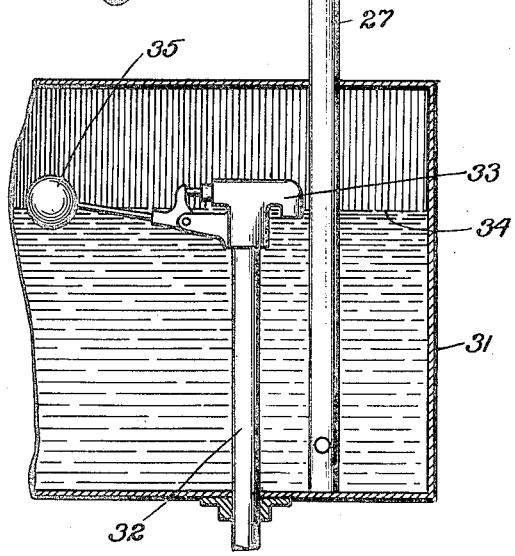
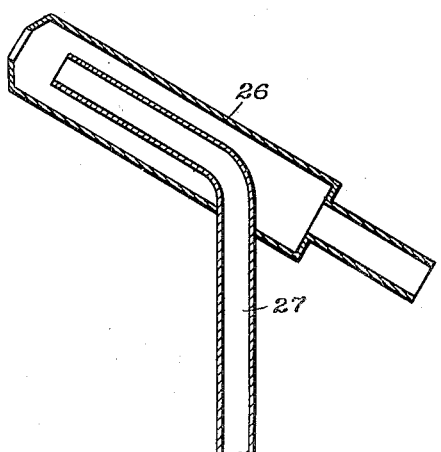

1,437,907

UNITED STATES PATENT OFFICE.

CURTIS J. PATTERSON, OF KANSAS CITY, MISSOURI, ASSIGNOR TO THE CAMPBELL BAKING COMPANY, OF KANSAS CITY, MISSOURI, A CORPORATION OF DELAWARE.

APPARATUS FOR DISINFECTING BAKERY PRODUCTS.

Application filed June 24, 1921. Serial No. 480,175.

*To all whom it may concern:*

Be it known that I, CURTIS J. PATTERSON, a citizen of the United States, residing at Kansas City, in the county of Jackson and State of Missouri, have invented certain new and useful Improvements in Apparatus for Disinfecting Bakery Products; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an apparatus for treating bakery products to prevent the formation of fungous growths, such as must and mold, thereon.

According to modern bakery practice the bakery product, particularly bread, is enveloped in a paper wrapper after it leaves the oven and before it is ready for distribution. There is an interval between the time the bread or other bakery product leaves the oven and the time that the wrappers are applied, which is necessitated by the fact that the bread or other bakery product is usually cooled by passing it along through the medium of conveyors to the wrapping machine at a point distant from the oven.

It has been found that not infrequently fungi accumulates on the bread between the time it leaves the oven and the time it is received in the wrapping machine and that after the wrapper has been applied, the fungi develops into visible must and mold whenever there is sufficient moisture and suitable temperature to aid in its development.

The apparatus forming the subject matter of my invention is capable of delivering a substance in the form of a mist capable of preventing development of the must and mold. This mist can be delivered to a zone between the wrapper and the bakery product so that when the wrapper is applied, the substance will spread over the entire crust and render inert any previously accumulated fungi.

The mist can be applied while the wrapping operation is taking place without in any way interfering with the wrapping operation or without in any way slowing up the wrapping operation. Indeed, the device contemplated by my present invention is capable of being applied to an existing type of wrapping machine without in any way re-arranging or curtailing the efficiency of such machine.

Various disinfectants may be employed to be delivered to the zone adjacent to the bakery product but I recommend ammoniated water; that is, an ammonia solution up to about 28% which may be atomized over the loaf in the form of a mist or spray about the time that the loaf is entering the wrapper.

The novel construction of the invention as well as the novel manner in which it is associated with the bread wrapping machine will be apparent by reference to the following description in connection with the accompanying drawings, in which—

Fig. 1 is an end view of a bread wrapping machine to which my invention is applied.

Fig. 2 is a detail perspective view of the spraying apparatus.

Fig. 3 is a fragmentary sectional view through the reservoir, one spray nozzle being shown in elevation.

Fig. 4 is a vertical, longitudinal, sectional view through an atomizer spray nozzle, and Figs. 5, 6, 7, 8, 9 and 10 are diagrammatic views showing the progressive steps of applying the wrapper to the bakery product or loaf and showing the relative positions of the spray nozzles.

The wrapping machine, which per se constitutes no part of my invention, may be of any preferred construction capable of applying a wrapper to a loaf or to a baked product. I have shown a conventional form of wrapping machine now generally employed in bakeries in order to illustrate the application of my invention but I do not wish to be limited to its use in connection with any particular type of machine. Therefore, I will not attempt to specifically describe the various details of construction of the wrapping machine except in so far as they apply to the action of my invention.

The wrapping machine is adapted for wrapping loaves of bread, preferably with oiled or paraffined paper.

The wrapping machine is illustrated generically as consisting of a runway 1 onto which the loaves are fed so that they may gravitate down to the transverse conveyor 2, having upstanding arms or fingers 3 to carry the product shown as bread transversely into the machine so that a sheet 5 may be severed by the knife 6 from the roll 7 and moved in line with the loaf 4 so that when the loaf is raised, the sheet 5 will initially be in the position shown in Fig. 5. The loaf is raised by the carriers 8, operated by endless belts 9 and 10 and when it reaches the height of the endless conveyor belts, the transverse slats 11 on the endless conveyor 12 remove it to an enlongated table or runway 13 but at that time the loaf has been enveloped in a wrapper sheet 5, as shown in Fig. 10.

The purpose of my invention is to apply a disinfectant in the form of mist between the bread and the wrapper so that the mist or atomized disinfectant can spread over the entire surface of the baked product and enter the crevices and interstices of the crust sufficiently to render any accumulated fungous growths inert.

The apparatus for providing the application of the disinfectant is best shown in Figs. 1, 2 and 3.

Referring to Fig. 1: 14 designates a motor which operates an air compressor 15, communicating with a receiving tank 16 in the usual manner. Leading from the tank 16 is a pipe or conduit 17 discharging into a manifold 18, from which leads a plurality of air pipes 19, 20, 21 and 22 respectively, each communicating with an atomizer, the atomizers being designated 23, 24, 25 and 26. Each atomizer has a liquid tube 27, which extends into a liquid supplied from the tank 28 to a pipe 29 provided with a valve 30 to a reservoir or tank 31 through the pipe 32, the pipe 32 being provided with a float valve 33, as will be well understood, so that when the level of the liquid 34 in tank 31 recedes below a determined level, the ball float 35 will be effective in operating the valve 33, allowing the supply to be replenished and when the height of the liquid 34 reaches a determined degree, the ball float 35 will close off the valve 33 and prevent further supply of the liquid.

All of the atomizers could be connected directly through the top of the box or tank 31 but for convenience in location I have shown discharge pipes 36 and 37 leading from the bottom of the tank 31 and having reservoirs or chambers 38 and 39 into which the liquid pipes or tubes 27 project.

The construction of spraying devices and atomizers is so well known that it is thought to be unnecessary to enter into a detailed description here. Suffice to say that the nozzles are of such appropriate number and so disposed about the machine as the nature of the machine will demand and they are so relatively placed that they will supply mist to the zone about the bread. For example, when the bread first enters the machine and the sheet or wrapper 5 is in the position shown in Fig. 5 and just before its side edges 40 and 40' are bent under the bread, the central portion 41 of the sheet will be bent so that it will lie above the bread and provide a zone or space 42. At this time the antiseptic is sprayed between the wrapper and the bread or other bakery product and the spraying continues while the end portions 43 and 44 are smoothed in by an appropriate part of the wrapping machine and until the ends are folded over as shown in Figs. 8 and 9, the completed product being shown in Fig. 10 with the wrapper 5 completely enveloping the loaf and retaining between it and the loaf the antiseptic so that any previously accumulated fungi will be rendered inert if not completely destroyed.

Any means may be utilized for controlling the discharge of the mist from the atomizer nozzles but in the present embodiment of my invention a valve 45 is provided at the inlet to the manifold 18, the valve being operated by a lever arm 46, the upper curved end 47 of which will be wiped by the cross rods 48 on the carriers 10, the arrangement being so timed that there will be an intermittent discharge of the disinfectant mist in proper time relation with the wrapping movement of the machine so that the mist will enter the zone between the wrapper and the bread.

As heretofore stated, there is generally more or less invisible fungi on all bread entering the wrapping machine or, in fact, any bread which has been subjected to atmospheric conditions long enough to allow it to cool and this is what develops into the objectionable must and mold so apparent on bread which has been baked a sufficient time to allow the fungous growths to develop. By using my apparatus, however, the formation of the objectionable must and mold will not take place and extensive tests have indicated that the fungi is completely destroyed as it does not develop unless the bread becomes re-infected after it has been taken out of the wrapper.

Tests have demonstrated that the treatment does not injure the quality of the product, its nutritive value nor its digestibility; neither does the application of the ammoniated water in the proportion specified detract from the palatability of the baked product.

It is to be understood that the application of the disinfectant is not to preserve the loaf but to prevent the formation of must and mold during the time that the bread loaf is in the wrapper and it is my belief that the fungi is rendered inert due to the alkalinity of the ammonia which merely destroys the activity of the fungi but does not alter the food value of the product.

What I claim and desire to secure by Letters-Patent is:

1. The combination with a bakery product wrapping machine, of a spray device located adjacent to the wrapping elements and directed toward the path of movement of the baked product as it comes in contact with the wrapper.

2. The combination with a bakery product wrapping machine, of a disinfectant spraying apparatus having nozzles directed toward the wrapper sheet and folding mechanism of the wrapping machine to direct the disinfectant into a zone between the baked product and the wrapper when the wrapper is folded over the baked product and before it completely envelopes the baked product.

3. The combination with a bakery product wrapping machine, of a tank, and atomizers connected thereto and directed toward a central common zone and in co-operative relation with the wrapping apparatus of the wrapping machine.

4. The combination with a bakery product wrapping machine, of a plurality of spray nozzles, the outlets of which are directed toward the wrapping apparatus of the wrapping machine, and means for supplying a disinfectant to said spray nozzles.

5. The combination with a bakery product wrapping machine, of means for applying to the product a substance capable of preventing must and mold, and a controlling means therefor, actuated by a movable part on the wrapping machine.

In testimony whereof I affix my signature.

CURTIS J. PATTERSON.